United States Patent
Ala-Rämi et al.

(10) Patent No.: US 8,712,017 B2
(45) Date of Patent: Apr. 29, 2014

(54) NETWORK FAULT DETECTION

(75) Inventors: Timo Ala-Rämi, Nummela (FI); Erkki Joensuu, Siuntio (FI); Tuomas Erke, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/497,558

(22) PCT Filed: Sep. 30, 2009

(86) PCT No.: PCT/EP2009/062707
§ 371 (c)(1),
(2), (4) Date: Jul. 18, 2012

(87) PCT Pub. No.: WO2011/038762
PCT Pub. Date: Apr. 7, 2011

(65) Prior Publication Data
US 2012/0275574 A1    Nov. 1, 2012

(51) Int. Cl.
*H04M 1/24* (2006.01)
*H04M 3/08* (2006.01)
*H04M 3/22* (2006.01)

(52) U.S. Cl.
USPC ..................................... 379/14.01; 379/22.03

(58) Field of Classification Search
USPC ............ 379/14.01, 22.03, 133, 32.01, 112.01
See application file for complete search history.

(56) References Cited

U.S. PATENT DOCUMENTS 5,926,462 A * 7/1999 Schenkel et al. ............... 370/254
7,324,634 B2 * 1/2008 Hoy et al. ...................... 379/133

FOREIGN PATENT DOCUMENTS

| JP | 2007019843 A | 1/2007 |
| WO | WO0113607 A1 | 2/2001 |
| WO | WO 03090080 A1 * | 10/2003 |
| WO | WO03090080 A1 | 10/2003 |

* cited by examiner

*Primary Examiner* — Quoc D Tran
(74) *Attorney, Agent, or Firm* — Coats & Bennett, P.L.L.C.

(57) ABSTRACT

According to a first aspect of the present invention there is provided a method of detecting faults within a telecommunications network, said telecommunications network comprising a plurality of entities. The method comprises grouping said entities into one or more groups based on the call traffic handled by said entities or on the call traffic said entities are configured to handle, for at least one of said groups, monitoring the call length pattern of a plurality of grouped entities of said group, and for at least one of said grouped entities, comparing the monitored call length pattern of the grouped entity with the monitored call length pattern of one or more of the other grouped entities to determine if the behavior of said grouped entity is indicative of a fault. The entities may comprise nodes of the network or hardware elements within one or more nodes of the network.

21 Claims, 5 Drawing Sheets

NETWORK FAULT DETECTION

TECHNICAL FIELD

The present invention relates to telecommunication systems, and, more particularly, to fault detection in a telecommunication system.

BACKGROUND

Current telecommunications networks are very complex, being comprised of large numbers of nodes each of which can be further comprised of a number of hardware elements performing a variety of functions. The complexity of these networks and the ways in which these nodes are employed to implement the network functionality often makes problem detection and troubleshooting a difficult task. For example, a hardware fault in any of the network nodes involved in signalling and payload handling for voice calls may result in calls having poor speech quality, one-way speech (only one party hears speech and the other party does not hear anything), or mute calls (neither parties hear anything). Currently, such problems are usually only identified when a customer notifies or complains to the network operator. Once the existence of a problem has been verified, laborious manual test procedures are then required to actually locate the cause of the problem. Whilst hardware elements can be provided with Built-In Self Test (BIST) functionality, these self tests are not always sufficient for detecting all possible faults and cannot be implemented without impacting the ongoing traffic being handled by that hardware.

The difficulty arises largely due to the complexity of the networks as there can be a large number of possible entities that could be the source of the problem. For example, most networks pool their hardware resources such that any one of a number of resources may be used for a particular call. As a result of this pooling, even for two consecutive, identical calls different hardware resources may be used and the choice of hardware cannot be predicted. As a result, an ongoing problem will only occur arbitrarily, and reproduction of the problem for fault detection and test purposes will be very difficult.

SUMMARY

It is an object of the present invention to provide a method for detecting potential faults in a telecommunications network and identifying the source of the fault.

According to a first aspect of the present invention there is provided a method of detecting faults within a telecommunications network, said telecommunications network comprising a plurality of entities. The method comprises grouping said entities into one or more groups based on the call traffic handled by said entities or on the call traffic said entities are configured to handle, for at least one of said groups, monitoring the call length pattern of a plurality of grouped entities of said group, and for at least one of said grouped entities, comparing the monitored call length pattern of the grouped entity with the monitored call length pattern of one or more of the other grouped entities to determine if the behaviour of said grouped entity is indicative of a fault. The entities may comprise nodes of the network or hardware elements within one or more nodes of the network.

Embodiments of the invention provide that network faults can be detected automatically, without relying on customer complaints, and with improved speed and accuracy when compared with self test mechanisms and laborious manual test mechanisms.

The step of grouping said entities into one or more groups based on the call traffic said entities are configured to handle may comprise grouping said entities together if they fulfil one or more of the following criteria:
that they comprise the same hardware;
that they perform the same function;
that call traffic is distributed between them with the same probability; or
that they are in the same pool of resources.

The step of grouping said entities into one or more groups based on the call traffic handled by said entities may comprise monitoring the call length pattern for each of said plurality of entities for the duration of a learning period, comparing the monitored call length patterns of said plurality of entities, and grouping together those entities based on their call length patterns. The entities may be grouped together if the difference between the monitored call length patterns of those entities does not exceed a pre-defined group threshold.

It may determined that the behaviour of the grouped entity is indicative of a fault if the difference between the monitored call length pattern of the grouped entity and the monitored call length pattern of one or more of the other grouped entities exceeds a pre-defined fault threshold. Preferably, the behaviour of the grouped entity is indicative of a fault if, when the monitored call length pattern of the grouped entity is compared with the monitored call length pattern of more than one of the other grouped entities, the difference between the monitored call length patterns exceeds the pre-defined fault threshold for a pre-defined minimum number or minimum proportion of the entities in the group.

The step of comparing the monitored call length pattern of the grouped entity with the monitored call length pattern of one or more of the other grouped entities may be performed upon the expiry of a pre-defined monitoring period and/or once the length of a pre-defined minimum number of calls have been monitored for a pre-defined minimum number or proportion of the grouped entities.

The step of monitoring the call length pattern for each of a plurality of entities may comprise, for the duration of the learning period, each of said plurality of entities reporting the length of each call handled by that entity at the end of the call. The step of monitoring the call length pattern of a plurality of grouped entities may also comprise, for the duration of the monitoring period, each of the plurality of grouped entities reporting the length of each call handled by that entity at the end of the call.

The determination of the difference between the monitored call length patterns may comprise calculating the difference between the number of calls in each call length pattern whose lengths are below a pre-defined call length threshold.

Alternatively or in addition, determination of the difference between the monitored call length patterns may comprise calculating the difference between one or more statistically representative values determined as representing each of the call length patterns. The one or more statistically representative values may comprise any of the mean, median, mode, range, standard deviation, variance or percentile.

Alternatively or in addition, determination of the difference between the monitored call length patterns may comprise calculating the statistical difference between each of the monitored call length patterns. The statistical difference may be a probability value calculated using the Kolmogorov-Smirnov Test.

Each grouped entity may be initially classified as not being faulty. If the behaviour of a grouped entity that has been classified as not being faulty is subsequently determined to be indicative of a fault for a predefined number of successive monitoring periods, then said grouped entity may be classified as being potentially faulty.

If the behaviour of a grouped entity that has been classified as being potentially faulty is subsequently determined to be indicative of a fault for an additional predefined number of successive monitoring periods, then said grouped entity may be classified as being faulty. However, if the behaviour of a grouped entity that has been classified as being potentially faulty is subsequently determined not to be indicative of a fault for a further predefined number of successive monitoring periods, then said grouped entity may be classified as not being faulty.

If the behaviour of a grouped entity that has been classified as being faulty is subsequently determined not to be indicative of a fault for a yet further predefined number of successive monitoring periods, then said grouped entity may be classified as either being potentially faulty or as not being faulty.

If the behaviour of a grouped entity causes a change in the classification of said grouped entity, then the operator of the telecommunications network may be notified.

According to a second aspect of the present invention there is provided an apparatus configured to detect faults within a telecommunications network, said telecommunications network comprising a plurality of entities. The apparatus comprises a grouping unit grouping said entities into one or more groups based on the call traffic handled by said entities or on the call traffic said entities are configured to handle, a monitoring unit for monitoring the call length pattern of a plurality of grouped entities within at least one of said groups, and an analysis unit for comparing the monitored call length pattern of at least one of said grouped entities with the monitored call length pattern of one or more of the other grouped entities in the same group to determine if the behaviour of the grouped entity is indicative of a fault. The apparatus may be adapted/configured to perform any of the embodiments of the present invention described herein.

According to a third aspect of the present invention there is provided an apparatus configured to operate as an entity within a telecommunications network. The apparatus comprises a timer unit for measuring the length of each call handled by the entity, and a transmitter for reporting the length of each call to an entity configured to detect faults in said network. The apparatus may be adapted/configured to perform any of the embodiments of the present invention described herein.

DETAILED DESCRIPTION

It has been recognised here that, when a problem occurs due to a fault at a particular entity within a telecommunications network, such as a node of the network or a particular hardware element within a node, then the length of the calls handled by that entity is likely to decrease. For example, calls where a fault leads to poor speech quality will most likely lead to shorter calls as participants hang up and (maybe) try again. Therefore, if an entity handles a number of calls that are abnormally short for an entity of its type, then this can be taken as an indication of a fault at that entity.

In order to overcome, or at least mitigate the problems identified above there will now be described a method of detecting faults in a telecommunications network in which the lengths of calls handled by the entities within a network are monitored, and comparisons made between the call length patterns of similar entities. If this comparison indicates that the lengths of calls handled by a particular entity are abnormally short when compared with those of one or more similar entities, then this is indicative of a potential fault.

As well as providing a method for detecting the potential occurrence of a fault, this method also enables the source of the fault to be located, as an entity identified as handling calls whose duration is abnormally short when compared with the call length patterns of other similar entities is highly likely to be the source of the fault causing the problem. This is because, if the fault was to have occurred elsewhere within the network, then any resulting reduction in call length would most likely be distributed between a number of similar entities such that the behaviour of an individual entity would not appear abnormal when compared with other similar entities. For example, if all of the entities within a resource pool are monitored, a fault occurring outside the pool would affect the call length patterns of several if not all of the entities in the pool, depending upon the particular source of the fault and the manner in which it interacts with the pool. Furthermore, by only comparing entities with other similar entities, this method ensures that the call lengths used in the analysis are pertinent to the particular type of entity and are typical of those calls usually handled by such an entity. In addition, calls which are not answered, or calls whose durations are unusual (i.e. such as those made for tele-voting purposes) would be expected to be equally distributed across a group of similar entities such that they will not make any difference to the comparison.

Figure 1:
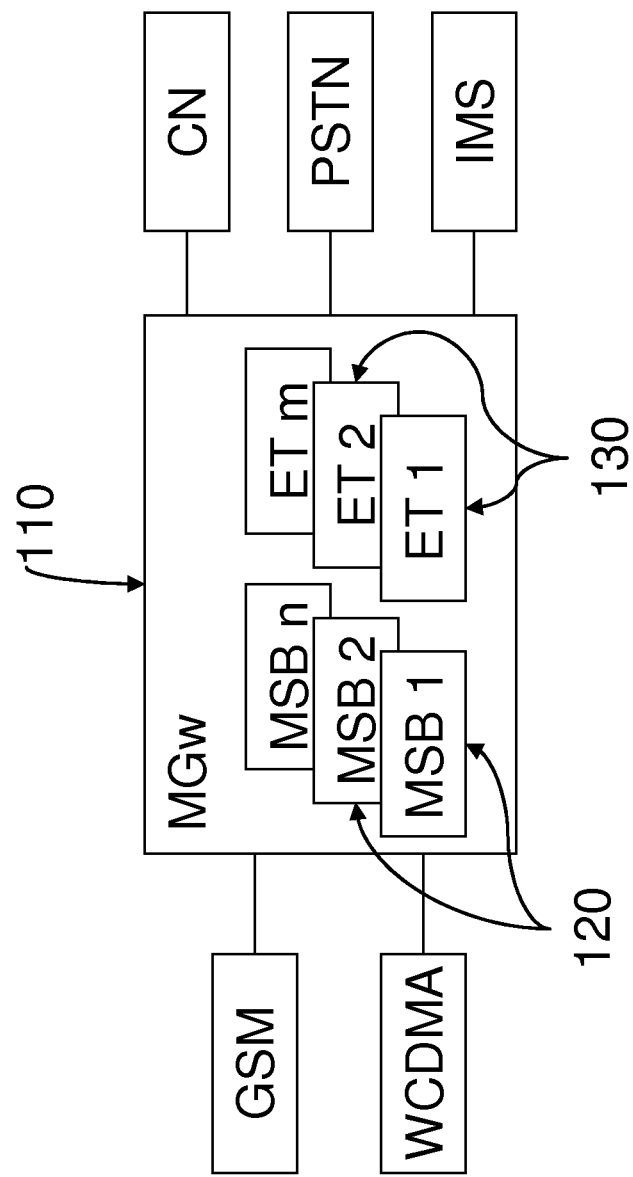
FIG. 1 illustrates schematically a Media Gateway node of a telecommunications network.

By way of example, FIG. 1 illustrates schematically a Media Gateway (MGw) node 110 of a telecommunications network. A MGw 110 is used to transfer digital media data (such as speech, audio or video data) e.g. within or between different networks that may use different data transfer protocols. Media gateways are used, for example, in Next Generation Networks or IP telephony. The MGw 110 is comprised of a number of Media Stream Boards (MSB) 120 that provide speech and data resources, and a number of Exchange Terminal boards (ET) 130 that provide interfaces for traffic over various types of transmission lines. In many cases, the connections with the MGw 110 are statistically distributed between the MSBs 120. By comparing the call length patterns of the different MSBs 120 it is possible to detect abnormal behaviour in any one of the MSBs 120. When abnormal call behaviour is detected, the behaviour of the corresponding entity is determined to be indicative of a fault with that entity. These methods can equally be used to detect faults in any type of entity within a telecommunications network, such as but not limited to the Base Station Controllers (BSC) of a GSM network, the Radio Network Controllers (RNC) of a UTRAN, or any hardware element within these nodes.

Figure 2:
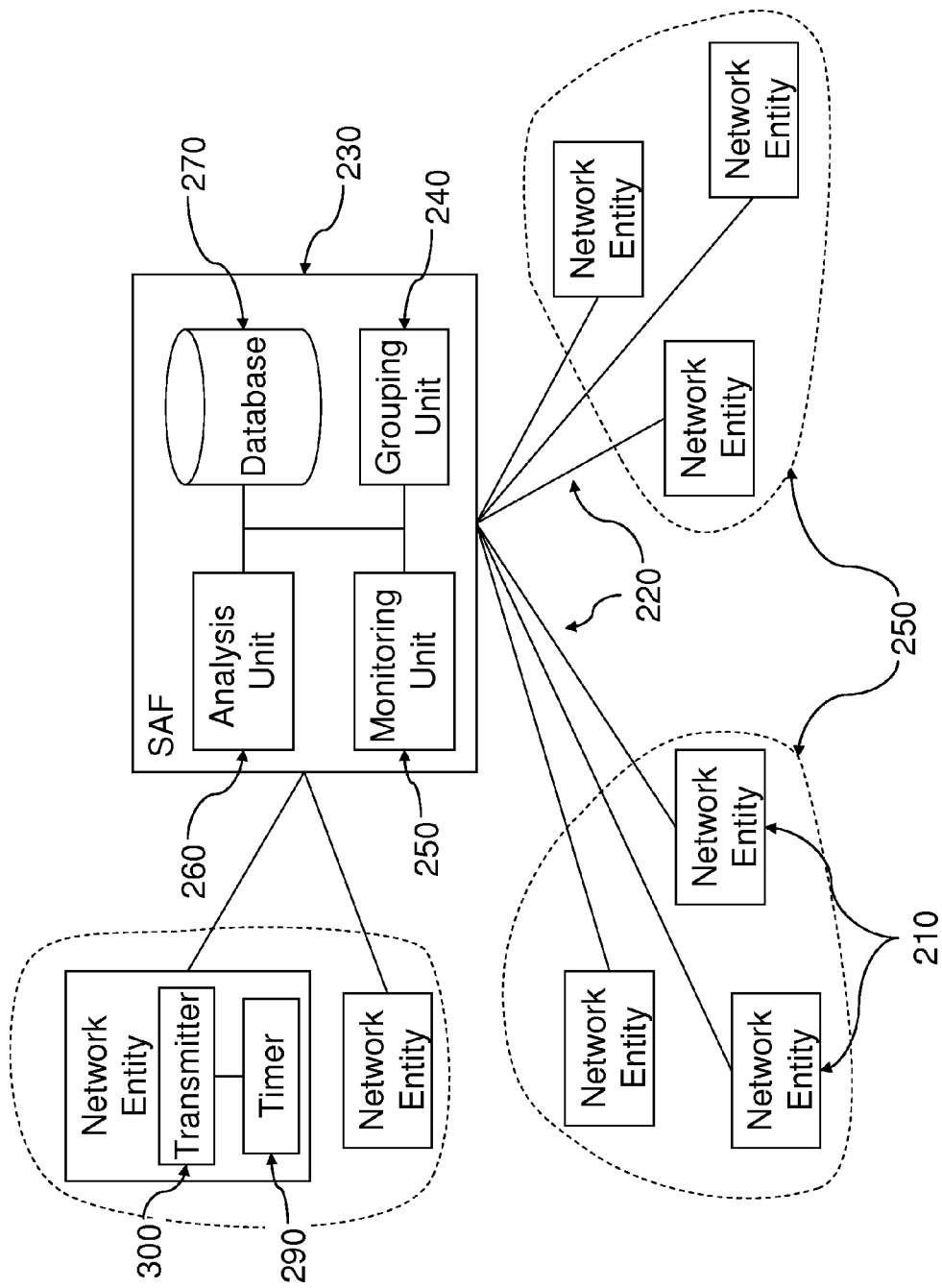
FIG. 2 illustrates schematically an example system architecture according to an embodiment of the present invention.

FIG. 2 illustrates schematically an example architecture in which the methods described herein may be implemented. The architecture may include a plurality of entities 210 with interfaces 220 to a Statistical Analysis Function (SAF) 230. The SAF 230 comprises a grouping unit 240, a monitoring unit 250 and an analysis unit 260. The architecture may also include a database 270 which may either be co-located with the SAF 230, as illustrated, or may be a separate entity. The entities 210 may be nodes of the network or may be hardware elements within the nodes of the network. If the entities 210 are nodes of a network, then the SAF 230 could be either co-located within one of the network nodes or could be located within an entirely separate node. If the entities 210 are hardware elements within an individual network node, then the SAF 230 could be a separate function provided within that node for identifying any hardware elements within the node that are displaying behaviour that is indicative of a fault. Alternatively, the entities 210 could be hardware elements within a number of network nodes. In this case, the SAF 230 could be either co-located within one of the network nodes or could be located within an entirely separate node.

The implementation of this method requires that those entities (be they nodes of the network or hardware elements within those nodes) that are to be monitored are grouped together with similar entities into peer groups 250, as illustrated in FIG. 2. For example, the entities within a peer group may be entities that form a pool of resources, nodes that perform the same function, or hardware elements within one or more nodes that perform the same function. Each peer group 250 is assigned a group identifier and each entity within a group is assigned an individual identifier. This grouping of entities is either pre-configured by the network operator using the SAF grouping unit 240, or the grouping unit can automatically configure the network entities into groups.

Each of the network entities 210 is associated with or comprises a timer unit 290 for measuring the length of each call handled by the entity, and a transmitter 300 for reporting the length of the calls to the SAF 230. The SAF monitoring unit 250 records this call length information for each of the entities in the database 270. Once a given period of time has expired and/or once a sufficient number of samples have been received from these entities, the SAF analysis unit 260 then compares the pattern of call lengths for an entity within a group, with the pattern of call lengths of a number of other entities within the same group 250. If this comparison indicates that the lengths of the calls handled by a network entity are abnormally short in comparison with the calls handled by other entities within the group, then this network entity can be identified as displaying behaviour that is indicative of a fault with that entity, and any actions taken accordingly. This procedure can be repeated for several or all of the entities within a group, and for each of the groups monitored by the SAF.

Preferably, the SAF does not simply compare the call lengths of individual calls, but requires that a number of samples are recorded for each grouped entity for analysis. This prevents occasional calls with atypical call lengths from causing an entity to be incorrectly identified as displaying behaviour that is indicative of a fault. As such, the comparison can be performed periodically, wherein the call length samples are recorded during a defined monitoring period. At the end of the monitoring period, the recorded samples are analysed and used to determine if any of the network entities are displaying behaviour that is indicative of a fault. However, if the number of samples that have been collected during this period is insufficient for analysis (i.e. due to a rare traffic scenario or a low-traffic period), then the monitoring period can be extended by appending the recorded samples to those collected in the next monitoring period, or these samples can be deleted and a new monitoring period started. Alternatively, it may be required that, before the analysis is performed and the results compared, a pre-defined number of samples must be recorded for each of the entities within a group (i.e. for each peer the length of N calls is recorded). This also provides that the number of samples recorded may be limited in order to reduce memory consumption.

Figure 3:
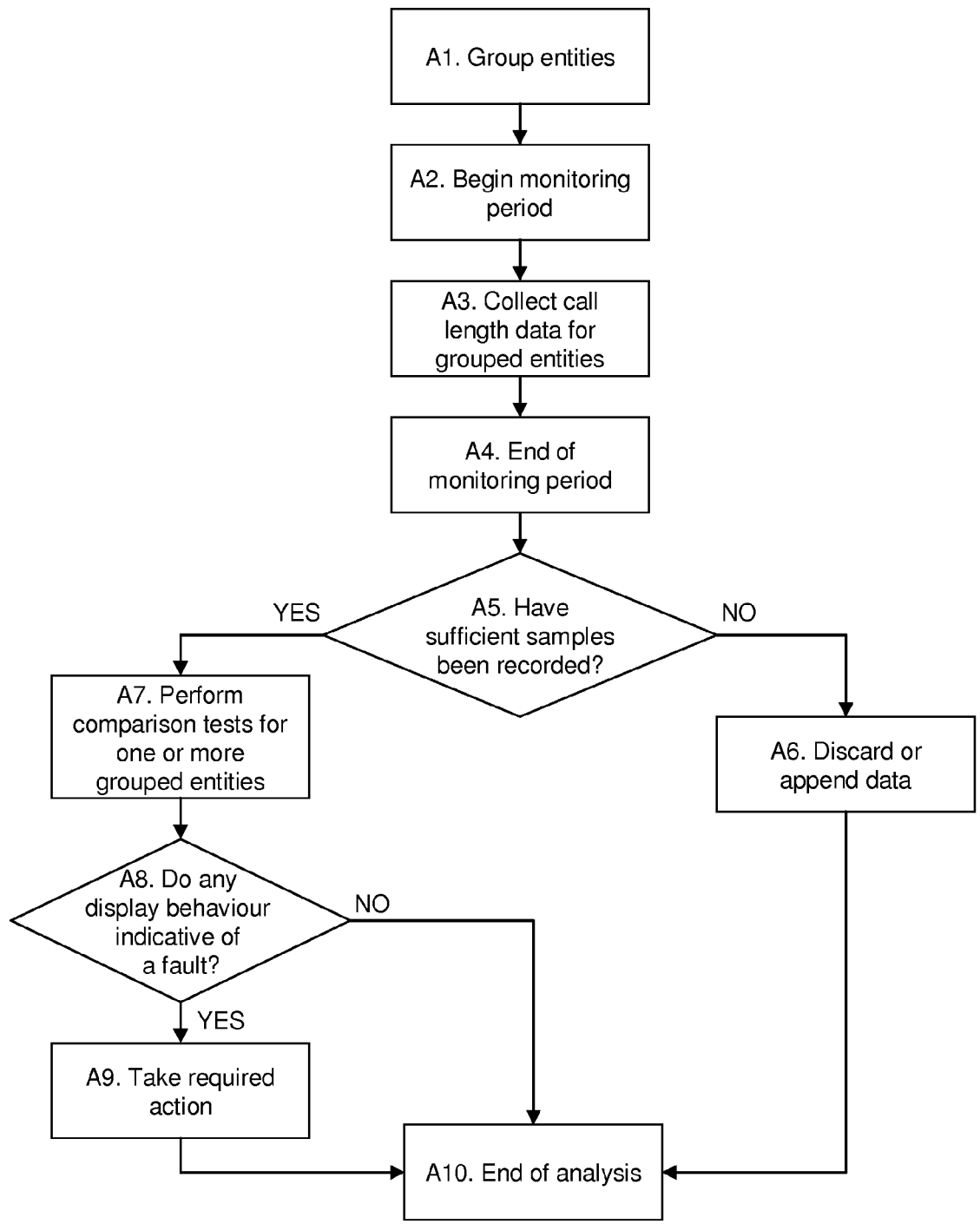
FIG. 3 is a flow diagram illustrating an example of the process of fault detection according to an embodiment of the present invention.

FIG. 3 is a flow diagram further illustrating an example of the process of fault detection according to an embodiment of the present invention. The steps performed are as follows:

A1. The entities within the network are grouped into one or more groups of similar entities. This grouping of entities is further described below.

A2. Subsequently, the SAF initiates a monitoring period, starting a timer. The duration of the monitoring period can be pre-configured by the network operator or determined by the SAF for each group.

A3. During the monitoring period the entities within a group send their call length data to the SAF at the end of each call. The SAF records this data in the database.

A4. The timer at the SAF expires, indicating the end of the monitoring period.

A5. The SAF then determines if a sufficient number of call length samples have been recorded during the monitoring period. For example, the SAF may require that a minimum number of samples are recorded for a minimum proportion of the entities within a group (e.g. that at least n samples have been recorded for 50% of the entities). Alternatively, the SAF may require that a minimum number of samples are recorded for each and every entity in the group.

A6. If an insufficient number of samples have been collected, the SAF may either discard the data collected during this monitoring period, or alternatively, the SAF may maintain the data collected during this monitoring period before proceeding to step A10, without performing any further analysis or comparison tests. This data may then be appended to data collected during the next monitoring period.

A7. If a sufficient number of samples have been collected, the SAF proceeds with analysing the samples, comparing the call length patterns of each grouped entity with those of one or more other entities from within the same group.

A8. The SAF then determines if the comparison tests show that any of the entities are displaying behaviour that is indicative of a fault with that entity, in other words, the SAF determines if the tests indicate that any of the entities in the group have handled abnormally short calls and if so, whether this is sufficient indication of a possible fault with that entity. If none of the comparison tests indicate a possible fault, then the process proceeds to step A10.

A9. If any of the comparison tests indicate a possible fault then the SAF takes any required action. For example, the SAF may identify the entities to the network operator. The process then proceeds to step A10.

A10. Following the completion of any data analysis the SAF may then trigger the start of a new monitoring period. Alternatively, the end of a monitoring period may immediately initiate the start of a new monitoring period, with the analysis of the samples collected during the preceding monitoring period being performed at the same time as data is collected during the new monitoring period.

In order for this method of fault detection to be successful, it is important that the groups of similar entities, or peers, are formed appropriately, as abnormal call lengths are identified by comparison of an entity with the other entities from within the same group. If these groups are formed inappropriately, such that the entities being compared are too dissimilar, then the analysis may incorrectly identify the behaviour of a network entity as indicative of a fault (i.e. false positives), or conversely, the analysis may fail to identify a faulty network entity. In this regard, only those entities that are of the same type should be placed in the same group (i.e. they are the same type of hardware). In addition, the entities within a group should be used for the same purpose or perform the same function, with the same probability (i.e. the call traffic handled by the entities within a group should be evenly distributed amongst the entities within the group).

Taking the example of the MGw illustrated in FIG. 1, an MSB 120 which is used for speech traffic should only be placed in a group with other MSBs which also handle speech calls, and a MSB that is used for circuit-switched data traffic should only be put in the same group as other MSBs that handle circuit-switched data connections. Furthermore, the grouping of entities should take into account the traffic distribution between the entities. For example, if traffic carried by a particular ET board 130 is generally only carried by certain MSBs (e.g. those MSBs residing on the same rack as the ET), then those MSBs should be grouped together, and separately from other MSBs. By way of further example, each ET board 130 is used for a specific route or connection type (i.e. IP, ATM or TDM); therefore ET boards of the same type should be grouped together. In addition, a server, such as a Media Gateway Controller (MGC), can allocate identifies to certain routes used in the gateway (MGw). Those entities using the same route could then be grouped into the same group.

The groups can be formed either through configuration by the network operator, or based upon some self-learning mechanism. In an example of such a self-learning mechanism, the network can form the groups automatically by collecting call length information for each of the entities during a learning period, comparing the call length patterns of each entity with those of one or more other entities, and grouping together those entities with similar results. The learning period may need to be a relatively long period of time, for example, to account for possible differences in peak and off-peak traffic. During this learning period, the SAF would not generate any fault alarms; however, following the learning period, the groups are formed and ready for use such that SAF can begin the fault detection procedures. For example, individual entities may be responsible for handling groups of TDM connections that are used for particular purposes. However, it may not be possible to determine the purpose of a particular TDM group from its configuration. As such, during a learning period, the SAF will initially collect call length data for each entity handling a TDM group. The data for each TDM group would then be compared with that of each of the other TDM groups, and those entities responsible for TDM groups with similar call length statistics would automatically be grouped into the same group.

The network operator can trigger a new self-learning operation when required, for example, following any changes in the network configuration. In addition, if a single entity is added to the network, then the SAF can perform self-learning for this entity alone, using the initial call length information collected during the learning period to determine which group the entity should be placed into. If a network entity is faulty prior to the learning period, or becomes faulty during the learning period, then, depending upon the entities the SAF is configured to monitor, the SAF would likely group such a faulty entity into its own group, comprised of this single faulty entity. In this case, at the end of self-learning period, a heath check function would be configured to notify the network operator of any groups containing only a single entity. The operator could then take any required actions (e.g. the operator could perform further tests, lock the TDM group or board, or replace the suspected faulty hardware).

Following group formation, the SAF 230 can begin collecting data from the grouped entities. During data collection, each of the grouped entities being monitored will report the length of any calls they handle to the SAF 230 at the end of each call. The entity will include an identifier with the report in order that the SAF 230 can associate the call length data with the appropriate entity. The SAF 230 records this data in the database 240. The entity may also include an identifier for its group if it is aware of the group in which it has been placed. It should be noted that the monitoring/data collection period may occur at different times for different groups.

When the monitoring/data collection period has ended and/or a sufficient amount of call duration data has been collected, the SAF compares the patterns of call length data recorded for an entity with those of other entities within the same group. There are several methods by which this comparison can be achieved, and these methods of comparison can be applied as alternatives or can be used in combination.

By way of example, according to a first method of comparison, for each entity within a group, one or more values that are statistically representative of the call length pattern of the entity can be calculated. Then, for an entity within the group, the one or more statistically representative values calculated for that entity can be compared with the statistically representative values calculated for other entities within the same group. For example, the mean or median call length could be calculated and compared between each entity. However, these statistically representative values could comprise any statistically relevant value or combination of statistically relevant values, such as the mean, median, mode, range, standard deviation, variance or percentile etc. Significant differences in these values between entities could be taken as an indication of a fault. The significance of the difference could be determined using a threshold.

A second method of performing the comparison could be to calculate the statistical difference between the call length patterns of two entities. The statistical difference is a measure of the distance between the distributions of two different datasets (i.e. a measure of the equality/similarity of the datasets). For example, the Kolmogorov-Smirnov (KS) test could be used to estimate the difference between two call length patterns. The result of the KS test is the probability, or p-value, that two datasets (in this case, the call length patterns of two entities) originate from the same distribution. According to this method, the KS test would be performed to compare the call length data for an entity with that of another entity in the same group. The resulting p-value could then be compared against a threshold p-value configured by the network operator, in order to determine if the difference between the call length data of the two entities is significant. If the p-value does not exceed the threshold (i.e. it is larger than the threshold limit) then the difference between the two entities is determined to be insignificant and the entities can be said to have passed this comparison. If the p-value does exceed the threshold (i.e. it is smaller than the threshold limit) then the difference between the two entities is determined to be significant and indicative of abnormally short calls for one of the two entities, such that the entity with the shortest call lengths can be said to have failed the comparison. If a p-value calculated for two grouped entities indicates a possible fault, and if a further check is required to determine which of the two entities has the shortest call lengths (i.e. there are only two entities in the group), then this can be determined by, for example, calculating and comparing one or more statistically representative values, such as the average or percentile values of the call length patterns of the two entities.

The SAF can either rely on just a single failure (i.e. a comparison that has been determined as indicating a significant difference between the call length data of two entities) before determining that an entity is displaying behaviour that is indicative of a fault, or the SAF can operate on the basis that a proportion of the entities within a group will always be behaving normally, such that an entity must pass the comparison against at least this proportion of the entities in its group to be considered as behaving normally. For example, if it is assumed that at least half of the entities in a group will always be behaving normally, then an individual entity will have to pass the comparison against at least half the entities in its group. If the entity does not pass the comparison against at least half the entities in its group, then the behaviour of the entity can be determined to be indicative of a fault.

As an alternative to simply flagging an entity as behaving abnormally, the SAF can use the results of the comparisons to put each entity into an appropriate class, the class indicating the potential fault status of the entity. For example, the SAF can maintain white, gray and black lists of entities. Those entities in a white list are those that are currently considered to be behaving normally (i.e. not being faulty), whilst those entities in a gray list are those that are possibly faulty, having recently begun displaying abnormal behaviour but not yet displaying consistent abnormal behaviour, and those entities in a black list are those entities that have displayed consistent abnormal behaviour such that this behaviour is considered to be indicative of a fault.

Each monitored entity will initially be placed in the white list. If, during the subsequent monitoring periods, an entity passes a sufficient number of comparisons tests against other entities within the same group to be considered as behaving normally, then the entity will remain in the white list. If an entity fails a sufficient number of comparison tests within one or more successive monitoring periods then that entity will be removed from the white list and placed in the gray list. If an entity in the grey list continues to fail a sufficient number of comparison tests within one or more successive monitoring periods, then that entity will be removed from the gray list and placed in the black list. In order for an entity in the black list to be downgraded into the gray list, or an entity in the gray list to be downgraded into the white list, that entity must pass a sufficient number of comparison tests within one or more successive monitoring periods. The number of successive monitoring periods that must be failed or passed in order to transition between the lists can be configured by the operator, and may be different for each possible transition.

When using these procedures to classify entities, an alarm is generated when an entity enters the black list. This alarm indicates to the network operator that this entity has consistently displayed behaviour that may indicate a fault. If an entity leaves the black list then the alarm is ceased. Any transition of an entity from one list to another may also be reported to the operator as an event. In addition, the network operator can enquire about the current status of any entity within the network.

Figure 4:
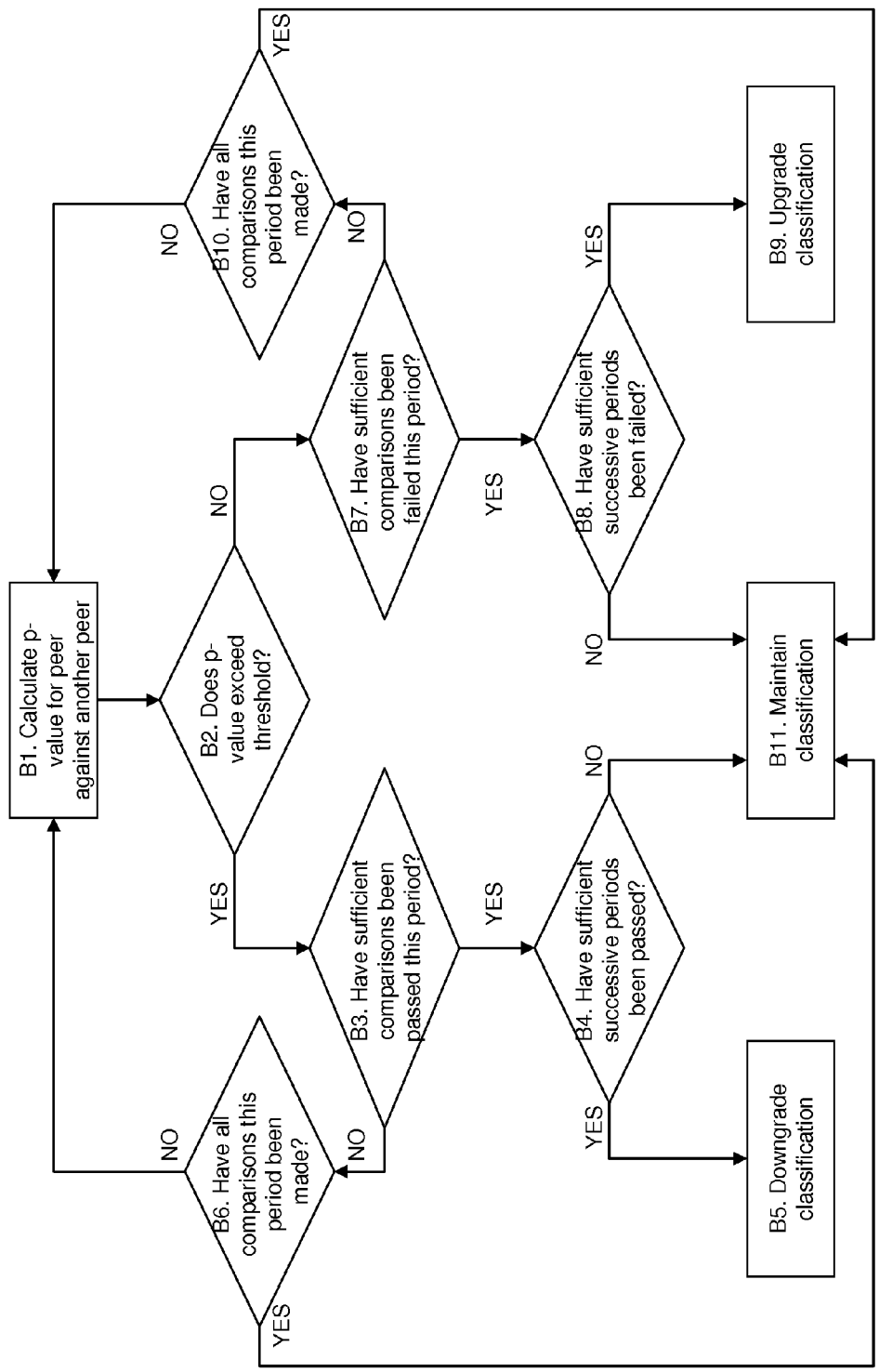
FIG. 4 is a flow diagram illustrating an example of the process of classifying an entity according to an embodiment of the present invention.

FIG. 4 is a flow diagram further illustrating an example of the process of classifying the fault status of an entity according to an embodiment of the present invention. The steps performed are as follows:

B1. At the end of a monitoring period the call length data for an entity is compared with that of another entity within the same group using the KS test to calculate the p-value.

B2. The calculated p-value is then compared with a threshold probability configured by the network operator.

B3. If, in step B2, it is determined that the p-value does not exceed the threshold probability, the entity is considered to be behaving normally (i.e. its call lengths are not abnormally short) in comparison with the other entity, and therefore to have passed this comparison. The network operator can require that, for each monitoring period, each entity must pass comparisons with a minimum number or proportion of the other entities within the same group before it can be considered to be behaving normally. As such, it is then determined if the entity has passed a sufficient number of comparisons during this period.

B4. If, in step B3, it is determined that the entity has passed comparisons against a sufficient number or proportion of the other entities within the same group, it is considered to have passed this monitoring period. The network operator can require that each entity must pass a minimum number of successive monitoring periods to be considered clear of any faults. As such, it is then determined if the entity has passed a sufficient number of monitoring periods.

B5. If, in step B4, it is determined that the entity has passed a sufficient number of successive monitoring periods, then its classification can be downgraded from a black list to a gray list, or from a gray list to a white list, depending upon its classification at the begin of the monitoring period. If the entity was already in the white list then it will remain in the white list.

B6. If, in step B3, it is determined the entity has not passed comparisons against a sufficient number or proportion of the other entities within the same group, it is then determined if the entity has been compared with all of the other entities within its group, or at least with all of the other entities within its group that have sufficient call length data for comparison. If it has not, then the process returns to step B1 and the entity is compared with another entity from its group.

B7. If, in step B2, it is determined that the p-value does exceed the threshold probability, the entity is considered to be behaving abnormally (i.e. its call lengths are abnormally short) in comparison with the other entity, and therefore to have failed this comparison. The network operator can require that, for each monitoring period, each entity must fail comparisons with a minimum number or proportion of the other entities within its group before it can be considered to be behaving abnormally. As such, it is then determined if the entity has failed a sufficient number of comparisons during this period.

B8. If, in step B7, it is determined that the entity has failed comparisons against a sufficient number or proportion of the other entities within its group, it is considered to have failed this monitoring period. The network operator can require that each entity must fail a minimum number of successive monitoring periods to be considered faulty. As such, it is then determined if the entity has failed a sufficient number of monitoring periods.

B9. If, in step B8, it is determined that the entity has failed a sufficient number of successive monitoring periods, then its classification can be upgraded from a white list to a gray list, or from a gray list to a black list, depending upon its classification at the begin of the monitoring period. If the entity was already in the black list then it will remain in the black list.

B10. If, in step B7, it is determined the entity has not failed comparisons against a sufficient number or proportion of the other entities within its peer group, it is then determined if the entity has been compared with all of the other entities within its group, or at least with all of the other entities within its group that have sufficient call length data for comparison. If it has not, then the process returns to step B1 and the entity is compared with another entity from its group.

B11. If it is determined, in steps B4 or B8 respectively, that the entity has not passed or failed a sufficient number of successive monitoring period, or if it is determined, in steps B6 or B10, that the entity has been compared with all of the other entities within its group with which a comparison can be made, then the current classification of the entity is maintained.

Figure 5:
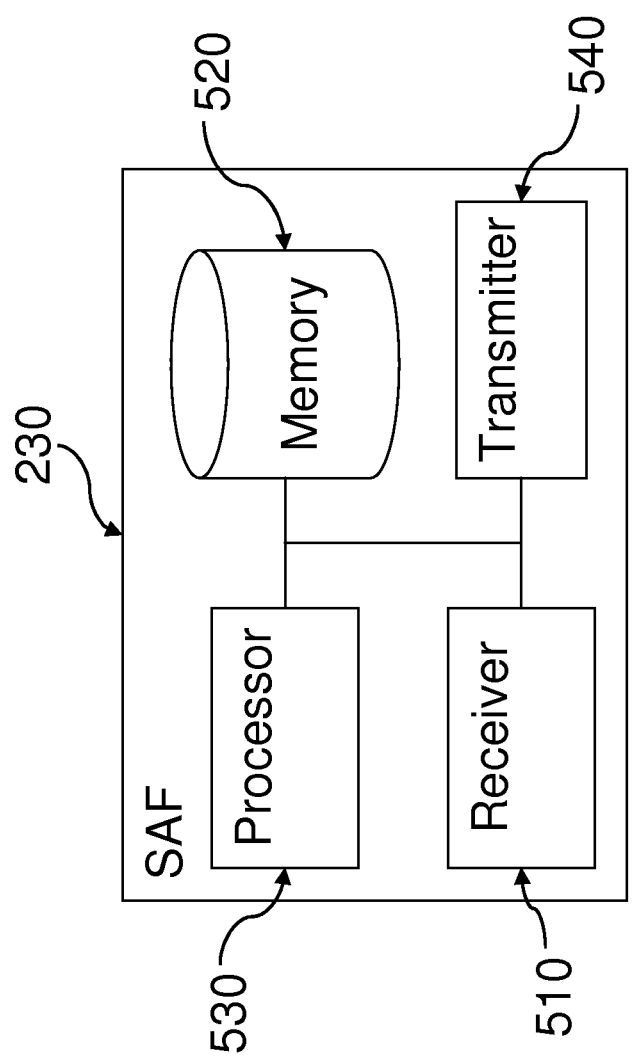
FIG. 5 illustrates schematically an example of a fault detection apparatus according to an embodiment of the present invention.

FIG. 5 illustrates schematically a SAF 230 suitable for implementing the methods described above. The SAF 230 can be implemented as a combination of computer hardware and software. The SAF comprises a receiver 510, a memory 520, a processor 530 and a transmitter 540. During both a learning period and a monitoring period, the call length data is received from the entities monitored by the SAF 230 by the receiver 510. This call length data is then stored in the memory 520. Alternatively, the call length data could be stored in a separate database. At the end of a learning period, the processor 530 can analyse the call length data to group the network entities into appropriate groups. The groupings are then stored in the memory 520. In addition, the processor 530 can assign identifiers to each of the groups, and to each of the entities within a group. These identifies would also be stored in the memory, and the corresponding entities notified of the identifiers by messages sent using transceiver 540. At the end of a monitoring period, the processor 530 can analyse the call length data to perform fault detection for entities that have already been grouped. This analysis can result in an entity being identified as potentially faulty. Alternatively, this analysis may result in a change in the fault status classification of an entity. In either case, the results would be stored in the memory 520 for the corresponding entities, and the network operator notified by means of a message sent using the transmitter 540.

The methods described above provide that network faults can be detected automatically, without relying on customer complaints, and with improved speed and accuracy when compared with self test mechanisms and laborious manual test mechanisms.

It will be appreciated by the person of skill in the art that various modifications may be made to the above-described embodiments without departing from the scope of the present invention. For example, the above embodiments rely on comparing the call length information of an entity with that of other entities within the same group. However, it is also possible that the call length information of an entity can be compared against that generated by a similar entity with simulated faults. If the call length information of an entity matches that of a similar entity in which a fault has been simulated, then the behaviour of the entity can be determined to be indicative of a fault.

The invention claimed is:

1. A method of detecting faults within a telecommunications network, said telecommunications network comprising a plurality of entities, the method comprising:

grouping said entities into one or more groups based on one of the call traffic handled by said entities and the call traffic said entities are configured to handle;

for at least one of said groups, monitoring the call length pattern of a plurality of grouped entities of said group for a predetermined monitoring period;

at the end of the predetermined monitoring period, determining whether a predetermined number of call length patterns have been recorded; and if the predetermined number of call length patterns have been recorded:

for at least one of said grouped entities, comparing the monitored call length pattern of the grouped entity with the monitored call length pattern of one or more of the other grouped entities to determine if the behavior of said grouped entity is indicative of a fault.

2. The method as claimed in claim 1, wherein the step of grouping said entities into one or more groups based on the call traffic said entities are configured to handle comprises grouping said entities together if they fulfill at least one of the following criteria:

that they comprise the same hardware;
that they perform the same function;
that call traffic is distributed between them with the same probability; and
that they are in the same pool of resources.

3. The method as claimed in claim 1, wherein the step of grouping said entities into one or more groups based on the call traffic handled by said entities comprises:

monitoring the call length pattern for each of said plurality of entities for the duration of a learning period, comparing the monitored call length patterns of said plurality of entities, and grouping together those entities based on their call length patterns.

4. The method as claimed in claim 3, wherein said entities are grouped together if the difference between the monitored call length patterns of those entities does not exceed a pre-defined group threshold.

5. The method as claimed in claim 1, wherein it is determined that the behavior of the grouped entity is indicative of a fault if the difference between the monitored call length pattern of the grouped entity and the monitored call length pattern of one or more of the other grouped entities exceeds a pre-defined fault threshold.

6. The method as claimed in claim 5, wherein it is determined that the behavior of the grouped entity is indicative of a fault if, when the monitored call length pattern of the grouped entity is compared with the monitored call length pattern of more than one of the other grouped entities, the difference between the monitored call length patterns exceeds the pre-defined fault threshold for one of a pre-defined minimum number and a minimum proportion of the entities in the group.

7. The method as claimed in claim 1, wherein the step of comparing the monitored call length pattern of the grouped entity with the monitored call length pattern of one or more of the other grouped entities is further performed once the length of a pre-defined minimum number of calls have been monitored for a pre-defined minimum number or proportion of the grouped entities.

8. The method as claimed in claim 7, wherein the step of monitoring the call length pattern of the plurality of grouped entities comprises:

for the duration of the predetermined monitoring period, each of the plurality of grouped entities reporting the length of each call handled by that entity at the end of the call.

9. The method as claimed in claim 3, wherein the step of monitoring the call length pattern for each of said plurality of entities comprises:
for the duration of the learning period, each of said plurality of entities reporting the length of each call handled by that entity at the end of the call.

10. The method as claimed in claim 1, wherein the entities comprise one of:
nodes of the network; and
hardware elements within at least one node of the network.

11. The method as claimed in claim 1, wherein determination of the difference between the monitored call length patterns comprises:
calculating the difference between one or more statistically representative values determined as representing each of the call length patterns.

12. The method as claimed in claim 11, wherein the one or more statistically representative values comprise any of the mean, median, mode, range, standard deviation, variance or percentile.

13. The method as claimed in claim 1, wherein determination of the difference between the monitored call length patterns comprises:
calculating the statistical difference between each of the monitored call length patterns.

14. The method as claimed in claim 13, wherein the statistical difference is a probability value calculated using the Kolmogorov-Smirnov Test.

15. The method as claimed in claim 1, wherein each grouped entity is initially classified as not being faulty.

16. The method as claimed in claim 15, wherein if the behavior of the grouped entity that has been classified as not being faulty is subsequently determined to be indicative of a fault for a predefined number of successive monitoring periods then said grouped entity is classified as being potentially faulty.

17. A method as claimed in claim 16, wherein if the behavior of the grouped entity that has been classified as being potentially faulty is subsequently determined to be indicative of a fault for an additional predefined number of successive monitoring periods then said grouped entity is classified as being faulty.

18. A method as claimed in claim 16, wherein if the behavior of the grouped entity that has been classified as being potentially faulty is subsequently determined not to be indicative of a fault for a further predefined number of successive monitoring periods then said grouped entity is classified as not being faulty.

19. A method as claimed in claim 17, wherein if the behavior of the grouped entity that has been classified as being faulty is subsequently determined not to be indicative of a fault for a yet further predefined number of successive monitoring periods then said grouped entity is classified as being one of potentially faulty and not being faulty.

20. An apparatus configured to detect faults within a telecommunications network, said telecommunications network comprising a plurality of entities, the apparatus comprising:
a processor configured to execute the functions of:
a grouping unit for grouping said entities into one or more groups based on one of call traffic handled by said entities and call traffic said entities are configured to handle;
a monitoring unit for monitoring a call length pattern of a plurality of grouped entities within at least one of said groups for a predetermined monitoring period; and
an analysis unit configured to:
determine, at the end of the predetermined monitoring period, whether a predefined number of call length patterns have been recorded; and
if the predefined number of call length patterns have been recorded, compare the monitored call length pattern of at least one of said grouped entities with the monitored call length pattern of one or more of the other grouped entities in the same group to determine if the behavior of the grouped entity is indicative of a fault.

21. An apparatus adapted to detect faults within a telecommunications network, said telecommunications network comprising a plurality of entities, the apparatus being configured to:
group said entities into one or more groups based on one of the call traffic handled by said entities and the call traffic said entities are configured to handle;
for at least one of said groups, monitor the call length pattern of a plurality of grouped entities of said group for a predetermined monitoring period;
at the end of the predetermined monitoring period, determine whether a predefined number of call length patterns have been recorded; and
if the predefined number of call length patterns have been recorded:
for at least one of said grouped entities, compare the monitored call length pattern of the grouped entity with the monitored call length pattern of one or more of the other grouped entities to determine if the behavior of said grouped entity is indicative of a fault.

* * * * *